US012568315B2

(12) United States Patent
    Kwak et al.

(10) Patent No.: US 12,568,315 B2
(45) Date of Patent: Mar. 3, 2026

(54) METHOD FOR PROVIDING RESTORATION OF MODIFIED IMAGE, AND ELECTRONIC DEVICE SUPPORTING SAME

(71) Applicant: SAMSUNG ELECTRONICS CO., LTD., Suwon-si (KR)

(72) Inventors: Seongsin Kwak, Suwon-si (KR); Sungoh Kim, Suwon-si (KR); Dasom Lee, Suwon-si (KR); Kwangyong Lim, Suwon-si (KR); Daiwoong Choi, Suwon-si (KR); Kyoungkeun Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 231 days.

(21) Appl. No.: 18/210,027

(22) Filed: Jun. 14, 2023

(65) Prior Publication Data

US 2023/0410268 A1     Dec. 21, 2023

Related U.S. Application Data

(63) Continuation of application No. PCT/KR2021/018157, filed on Dec. 2, 2021.

(30) Foreign Application Priority Data

Dec. 22, 2020     (KR) ........................ 10-2020-0181126

(51) Int. Cl.
    *H04N 23/80*        (2023.01)
    *G06T 5/20*         (2006.01)
                (Continued)

(52) U.S. Cl.
    CPC .............. *H04N 23/80* (2023.01); *G06T 5/20* (2013.01); *G06T 5/50* (2013.01); *H04N 23/95* (2023.01); *G06T 2207/20224* (2013.01)

(58) Field of Classification Search
    CPC ...... H04N 23/80; H04N 23/95; H04N 23/631; H04N 23/958; H04N 23/57; H04N 23/62;
                (Continued)

(56) References Cited

U.S. PATENT DOCUMENTS

| | | |
|---|---|---|
| 2003/0210335 A1 | 11/2003 | Carau, Sr. et al. |
| 2009/0274380 A1 | 11/2009 | Wedi |
| 2010/0322526 A1 | 12/2010 | Lee et al. |
| 2016/0110849 A1* | 4/2016 | Jain ........................ H04N 19/60 345/428 |

(Continued)

FOREIGN PATENT DOCUMENTS

| | | | |
|---|---|---|---|
| JP | H11167620 A | * | 6/1999 |
| JP | 2002209044 A | | 7/2002 |

(Continued)

OTHER PUBLICATIONS

International Search Report and Written Opinion for International Application No. POT/KR2021/018157; International Filing Date Dec. 12, 2021; Date of Mailing Mar. 4, 2022; 10 Pages.

(Continued)

*Primary Examiner* — Christopher Wait
(74) *Attorney, Agent, or Firm* — CANTOR COLBURN LLP

(57) ABSTRACT

An electronic device includes at least one processor and a memory functionally connected to the at least one processor, where the memory can store instructions so that, when executed, the at least one processor acquires a first image, acquires a second image by applying a visual effect to the first image, acquires a third image by reversely applying the visual effect to the second image, acquires, on the basis of the first image and the third image, reconstruction information for reconstructing the first image and stores, in the memory, the second image, information about the visual effect and the reconstruction information.

14 Claims, 10 Drawing Sheets

(51) Int. Cl.
    *G06T 5/50*       (2006.01)
    *H04N 23/95*    (2023.01)

(58) Field of Classification Search
    CPC ......................... G06T 5/20; G06T 5/50; G06T
                            2207/20224; G06T 5/00
    See application file for complete search history.

(56) References Cited

U.S. PATENT DOCUMENTS

| | | |
|---|---|---|
| 2017/0034523 A1 | 2/2017 | Ebrahimi et al. |
| 2017/0140797 A1 | 5/2017 | Amura |
| 2017/0213370 A1 | 7/2017 | Lea et al. |
| 2018/0082715 A1 | 3/2018 | Rymkowski et al. |
| 2019/0394437 A1 | 12/2019 | Ryu et al. |
| 2020/0380739 A1 | 12/2020 | Ansorregui et al. |

FOREIGN PATENT DOCUMENTS

| | | |
|---|---|---|
| JP | 2016076882 A | 5/2016 |
| JP | 20190074189 A | 6/2019 |
| JP | 2020074613 A | 5/2020 |
| KR | 20020031516 A | 5/2002 |
| KR | 20180014607 A | 2/2018 |
| KR | 20180119753 A | 11/2018 |
| WO | 2007108487 A1 | 9/2007 |

OTHER PUBLICATIONS

European Search Report corresponding to Application No. 21911305.7; Dated Apr. 22, 2024, pp. 19.

Korean Office Action corresponding to Application No. 10-2020-0181126; Dated Jan. 19, 2026.

\* cited by examiner

340

600

610

620

FILTER

630

631

700

710

720

730

METHOD FOR PROVIDING RESTORATION OF MODIFIED IMAGE, AND ELECTRONIC DEVICE SUPPORTING SAME

BACKGROUND

1. Field

Various embodiments of the disclosure relate to a method for providing an image and an electronic device supporting the same.

2. Description of the Related Art

Electronic devices such as smart phones provide an image editing function. For example, an electronic device may obtain an original image through a camera and apply a visual effect to the obtained original image to obtain an image with changed attributes (e.g., having different attributes from those of the original image, hereinafter, referred to as a 'visual effect-applied image'). As another example, the electronic device may obtain a visual effect-applied image by applying a visual effect to an original image stored in the memory of the electronic device.

SUMMARY

If a visual effect-applied image is obtained by applying a visual effect to an original image stored in the memory or obtained through a camera, the electronic device may store only the visual effect-applied image but may not store the original image (e.g., the original image may be deleted). When returning the visual effect-applied image to the original image (e.g., when restoring the original image), the electronic device may generate an original image with quality loss (e.g., data loss).

Non-destructive editing may refer to an editing technique that, after editing an original image, allows for a return from the edited image to an original image (e.g., the original image before editing) with no data loss (hereinafter, the operation of returning from the edited image to the original image is referred to as "restoration").

Non-destructive editing may be implemented by applying a visual effect to the original image and storing the visual effect-applied image, along with the original image. Storing the visual effect-applied image along with the original image may require twice as much storage space as storing the visual effect-applied image without the original image. Further, when separately storing the original image (and information about the visual effect) and the visual effect-applied image (e.g., when storing the original image and the visual effect-applied image in different storage spaces), if the stored original image is lost, it may be difficult to restore the original image. For example, data of the original image may be lost if a file system error (e.g., power off of the electronic device or an error in storage space) occurs while the electronic device performs a write operation on the data of the original image after separately storing the original image and the visual effect-applied image. As another example, the electronic device may delete the original image by the user's input after separately storing the original image and the visual effect-applied image. When the data of the original image is lost or the original image is deleted, it may be hard to restore the original image.

Various embodiments of the disclosure relate to a method for providing an image and an electronic device for supporting the same, which may restore an original image with no data loss, by storing the visual effect-applied image, information about the visual effect, and information for restoring the original image, when obtaining (e.g., generating) the visual effect-applied image from the original image.

Objects of the disclosure are not limited to the foregoing, and other unmentioned objects would be apparent to one of ordinary skill in the art from the following description.

According to various embodiments of the disclosure, an electronic device may comprise at least one processor and a memory functionally connected with the at least one processor. The memory may store instructions that are configured to, when executed, enable the at least one processor to obtain a first image, obtain a second image by applying a visual effect to the first image, obtain a third image by reversely applying the visual effect to the second image, obtain restoration information for restoring the first image, based on the first image and the third image, and store the second image, information about the visual effect, and the restoration information in the memory.

According to various embodiments of the disclosure, a method for providing an image by an electronic device may comprise obtaining a first image, obtaining a second image by applying a visual effect to the first image, obtaining a third image by reversely applying the visual effect to the second image, obtaining restoration information for restoring the first image, based on the first image and the third image, and storing the second image, information about the visual effect, and the restoration information in a memory of the electronic device.

According to various embodiments of the disclosure, a method for providing an image and an electronic device for supporting the same may obtain an original image with no data loss when restoring the original image by storing together the visual effect-applied image, information about the visual effect, and information for restoring the original image when obtaining (e.g., generating) the visual effect-applied image from the original image.

Further, the electronic device may secure more storage space than when storing the original image, by storing the visual effect-applied image, information about the visual effect, and information for restoring the original image while not storing the original image.

DETAILED DESCRIPTION

Figure 1:
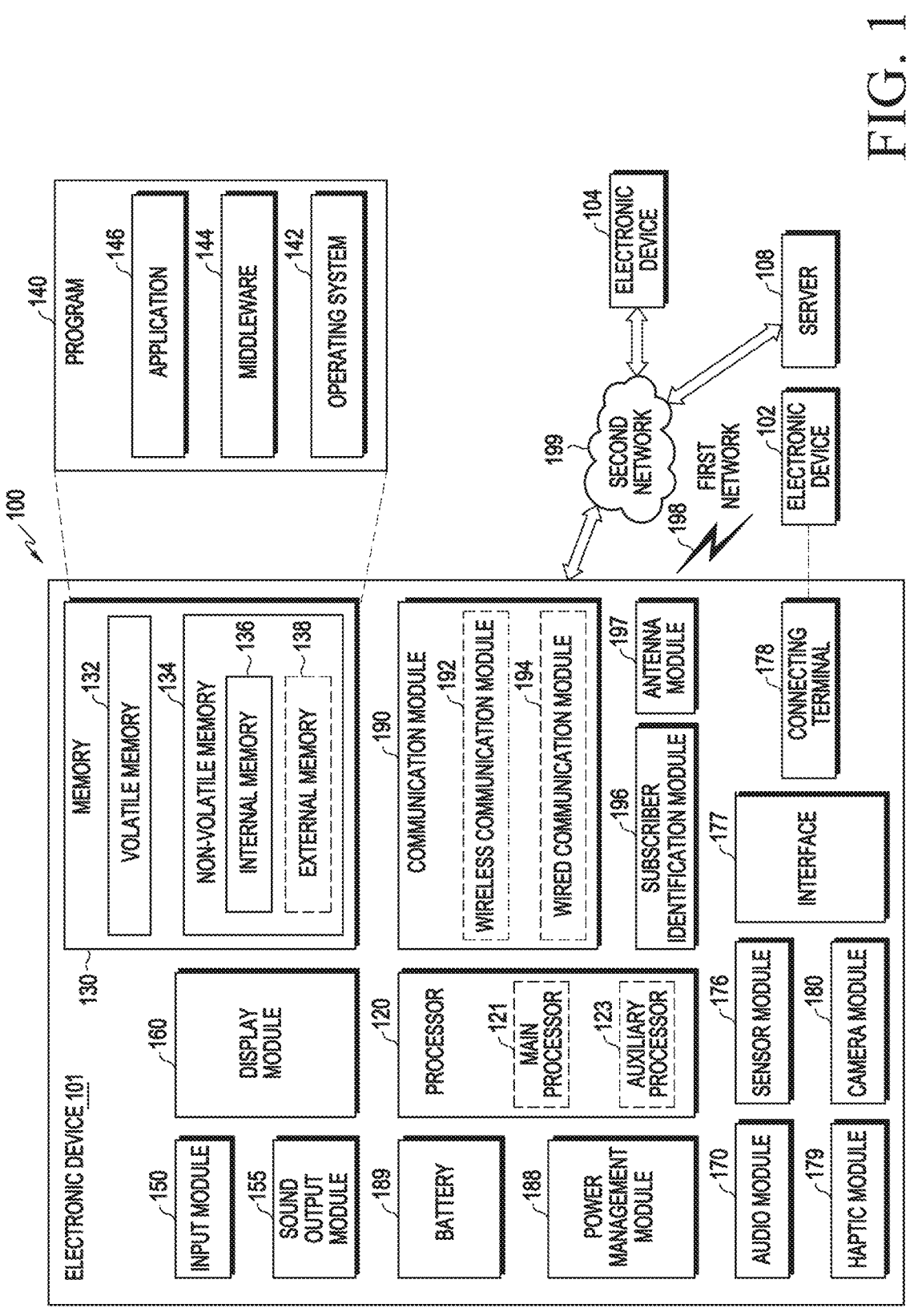
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 50 network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 40 network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency hand.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A. B. or C," "at least one of A, B, and C." and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
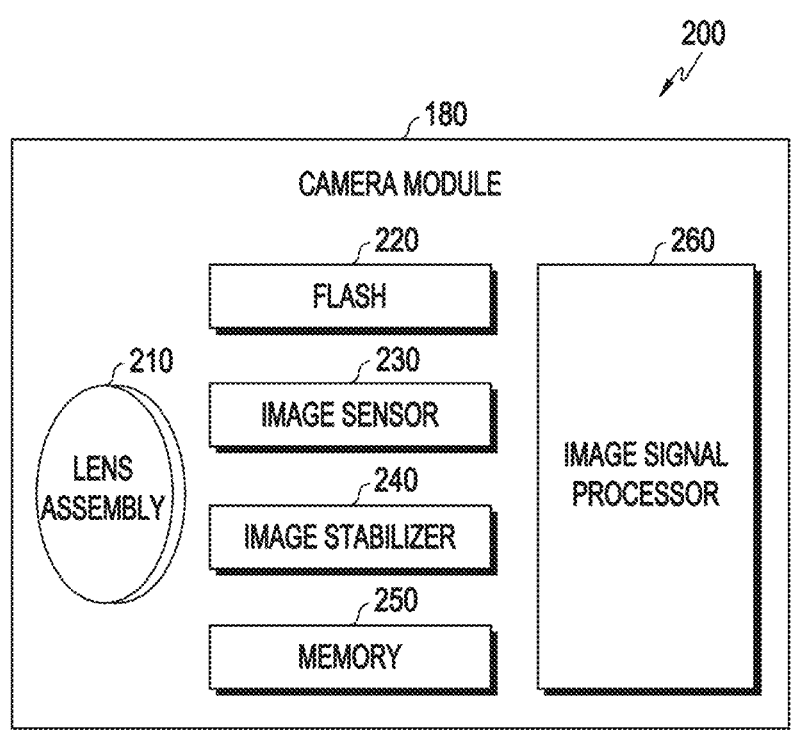
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In this case, the camera module 180 may form, e.g., a dual-camera, a 360-degree camera, or a spherical camera. Some of the plurality of lens assemblies 210 may have the same lens attribute (e.g., field of view, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (e.g., a red-green-blue (RGB) LED, a white LED, an infrared LED, or an ultraviolet LED), or a xenon lamp. The image sensor 230 may obtain an image corresponding to an object by converting light emitted or reflected from an object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, e.g., a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This makes it possible to compensate for at least some of the negative effects of the movement on the image being taken. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented as, e.g., an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules may form a telephoto camera. Similarly, at least one of the plurality of camera modules 180 may be a front camera and at least another of the plurality of camera modules may be a rear camera.

Figure 3:
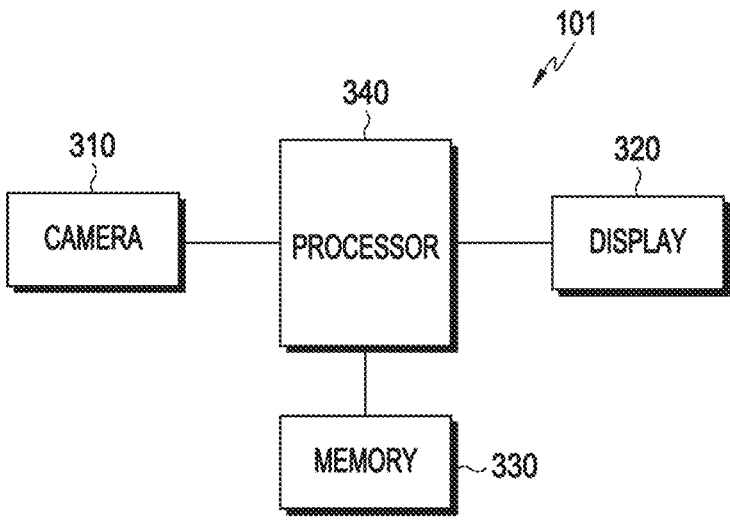
FIG. 3 is a block diagram illustrating an electronic device according to various embodiments.

FIG. 3 is a block diagram illustrating an electronic device 101 according to various embodiments.

Referring to FIG. 3, in an embodiment, an electronic device 101 may include a camera 310, a display 320, a memory 330, and a processor 340.

In an embodiment, the camera 310 may be included in the camera module 180 of FIG. 1 or the camera module 180 of FIG. 2.

In an embodiment, the camera 310 (e.g., the image sensor 230) may obtain (e.g., generate) an image. For example, the camera 310 (e.g., the image sensor 230) may obtain at least one image (e.g., image frame) based on camera settings (e.g., settings for lens attributes (e.g., focal length, focus, or exposure) of the lens assembly 210). In an embodiment, the camera 310 (the image stabilizer 240 or image signal processor 260) may perform operations for compensating for (e.g., image stabilization) the shakes caused by movement of the camera 310 or the electronic device 101 including the camera 310. For example, the camera 310 may obtain images that are shake-compensated through optical image stabilization (OIS), electro image stabilization (EIS), or digital image stabilization (DIS).

The image obtained based on the camera settings is denoted below as a 'first image' or 'original image.'

In an embodiment, the first image may refer to an image to which no visual effects are applied.

In an embodiment, the first image may refer to an image to which a visual effect is to be applied. For example, the first image may be an image before application of the visual effect to be currently applied. In another example where after a first visual effect is applied to an image, the image is stored in the memory 330, and a second visual effect is applied to the first visual effect-applied image. The first image may be the first visual effect-applied image to which the second visual effect is to be applied and which is stored in the memory 330.

In an embodiment, the visual effect may refer to an effect visually appearing on the image as an attribute of the image is changed. In an embodiment, the attributes of the first image may include at least one of color tone, contrast, brightness, saturation, image complexity, sharpness, shadow, and white balance. However, the attributes of the first image are not limited to the above-described example. In an embodiment, the visual effect may include a filter effect (e.g., an effect with a color tone filter applied), a blur effect, a vignetting effect, a portrait retouching, a bokeh effect, an image zoom in and/or out, and an image rotation. However, the visual effect is not limited to the above-described examples, and may include all effects that may be visually displayed in the image by changing the attributes of the image.

In an embodiment, applying the visual effect to the first image may include changing the attribute of the first image, using a filter (e.g., a color tone filter) (or a look-up table, or a matrix, or a function) to change at least one of the attributes of the image.

Hereinafter, the image to which the visual effect has been applied to the first image is denoted as a 'second image' or 'visual effect-applied image.'

In an embodiment, the camera 310 may obtain the second image by applying the visual effect to the first image after obtaining the first image. For example, the camera 310 (e.g., image sensor 230) may obtain the first image, and the camera 310 (image signal processor 260) may apply the visual effect to the first image, thereby obtaining the second image. As another example, after the visual effect is applied to the first image based on the user input, the camera 310 may obtain the second image by applying the selected visual effect to the first image.

In an embodiment, the camera 310 may perform the operation of obtaining the first image, and the processor 340 may apply the visual effect to the obtained first image, thereby performing the operation of obtaining the second image. For example, the camera 310 (e.g., image sensor 230) may perform the operation of obtaining the first image, and the processor 340 may apply the visual effect to the first image using an image editing application (e.g., gallery application or camera application), thereby performing the operation of obtaining the second image.

In an embodiment, the first image and the second image may be still images or dynamic images (e.g., video images).

In an embodiment, the display 320 may be included in the display module 160 of FIG. 1.

In an embodiment, the display 320 may display the first image or the second image.

In an embodiment, the display 320 may display a preview image based on the image obtained through the camera 310 while the camera application is running. In an embodiment, the display 320 may display one or more images (or objects)

indicating one or more selectable visual effects while the preview image is displayed (or before or after the preview image is displayed). In an embodiment, when at least one visual effect is selected from among one or more visual effects based on a user input, the display 320 may display a preview image to which the at least one selected effect has been applied. In an embodiment, the display 320 may obtain a first image based on a user input while the preview image to which the at least one selected effect has been applied and display a second image to which the at least one selected effect has been applied to the obtained first image. However, the image displayed while the camera application is running is not limited to the above-described example.

In an embodiment, the display 320 may display one or more images (e.g., one or more thumbnail images) stored in the memory 330 (or image editing application) while the image editing application is running. In an embodiment, the display 320 may display at least one image selected from among one or more images based on the user input. In an embodiment, the display 320 may display one or more images (or objects) indicating one or more selectable visual effects. In an embodiment, when at least one visual effect is selected from among one or more visual effects based on a user input, the display 320 may display an image (e.g., the second image) produced by applying at least one selected effect to the at least one selected image. However, the image displayed while the image editing application is running is not limited to the above-described example.

In an embodiment, the display 320 may display the object (e.g., icon) corresponding to (e.g., mapped to) the function for restoring the first image from the second image while the camera application or image editing application is running. The operation of restoring the first image from the second image is described below in detail.

In an embodiment, the memory 330 may be included in the memory 130 of FIG. 1 or the memory 250 of FIG. 2.

In an embodiment, the memory 330 may include information required to perform the operation of providing an image and one or more modules for performing some of the operations for providing an image. The information and one or more modules stored in the memory 330 are described below in detail.

In an embodiment, the processor 340 may perform the overall operation of providing an image.

The operation performed by the processor 340 to provide an image is described below in detail with reference to FIGS. 4 to 12.

Although not shown in FIG. 3, in an embodiment, the electronic device 101 may further include other additional components than those shown in FIG. 3. For example, the electronic device 101 may further include a communication module 190 (e.g., communication circuit) of FIG. 1. When the electronic device 101 further includes the communication module 190, the electronic device 101 may transmit images to an external electronic device 102 or 104 (or server 108) or receive images from the external electronic device 102 or 104 (or server 108) through the communication module 190. For example, the electronic device 101 may receive a first image and/or a second image from the external electronic device 102 or 104 (or server 108) through the communication module 190 and store the received first image and/or second image in the memory 330. The electronic device 101 may edit the first image and/or the second image stored in the memory 330.

In an embodiment, the electronic device 101 may not include the camera 310 shown in FIG. 3. For example, when the electronic device 101 performs the operation of providing an image by the image editing application based on the image stored in the memory 330, the electronic device 101 may not include the camera 310.

Figure 4:
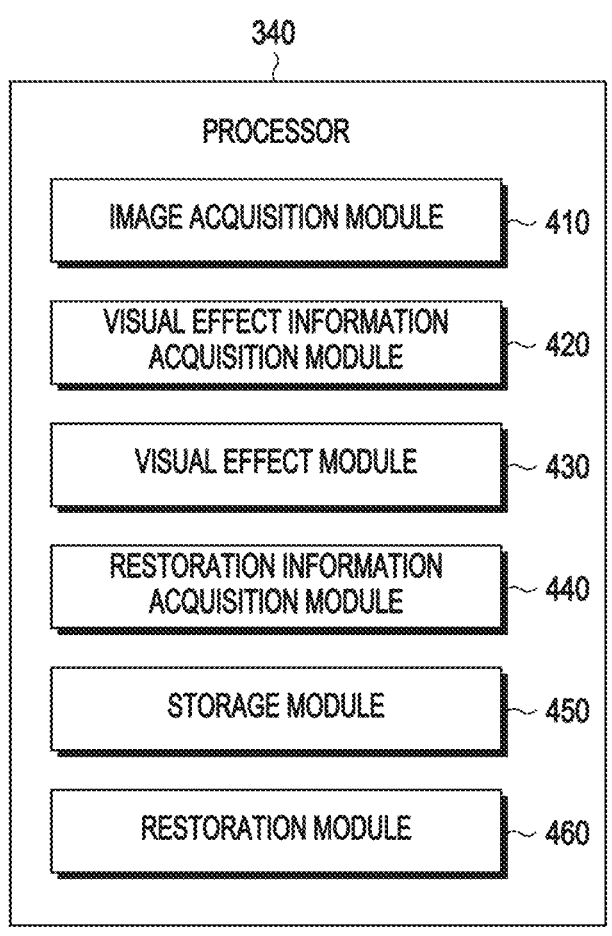
FIG. 4 is a block diagram illustrating a processor according to various embodiments.

FIG. 4 is a block diagram illustrating a processor 340 according to various embodiments.

Referring to FIG. 4, in an embodiment, the processor 340 may include an image acquisition module 410, a visual effect information acquisition module 420, a visual effect module 430, a restoration information acquisition module 440, a storage module 450, and a restoration module 460.

In an embodiment, at least some of the image acquisition module 410, visual effect information acquisition module 420, visual effect module 430, restoration information acquisition module 440, storage module 450, and restoration module 460 may be stored, as software modules, in the memory 330 and be executed by being loaded by the processor 340.

In an embodiment, the image acquisition module 410 may obtain the first image and the second image.

In an embodiment, the image acquisition module 410 may obtain the first image (original image) through the camera 310. For example, the image acquisition module 410 may obtain the first image from the camera 310 when the first image is obtained through the camera 310.

In an embodiment, the image acquisition module 410 may obtain the first image from the memory 330. For example, the image acquisition module 410 may obtain an image, selected from among the plurality of images stored in the memory 330 based on a user input, as the first image, while the image editing application is running.

In an embodiment, the image acquisition module 410 may obtain the first image from the external electronic device 102 or 104 (or server 108) through the communication module 190. For example, the image acquisition module 410 may obtain the first image received from the external electronic device 102 or 104 (or server 108) in real-time through the communication module 190.

In an embodiment, the image acquisition module 410 may obtain the second image from the camera 310. For example, when obtaining the second image by applying the visual effect to the first image obtained after the camera 310 obtains the first image, the image acquisition module 410 may obtain the second image from the camera 310.

In an embodiment, the visual effect information acquisition module 420 may obtain information about the visual effect applied to the first image to obtain the second image.

In an embodiment, the information about the visual effect applied to the first image to obtain the second image may include the visual effect applied to the first image. For example, the visual effect information acquisition module 420 may obtain the information about the visual effect applied to the first image by identifying the visual effect applied to the first image to obtain the second image by analyzing the metadata of the second image. As another example, the visual effect information acquisition module 420 may obtain information about the visual effect applied to the first image to obtain the second image, from the camera 310.

In an embodiment, the information about the visual effect applied to the first image to obtain the second image may include information about the filter (or lookup table or matrix or function) used to apply the visual effect to the first image. For example, the visual effect information acquisition module 420 may identify the visual effect applied to the first image to obtain the second image by analyzing the metadata of the second image. The visual effect information acquisition module 420 may identify information about the filter used to apply the visual effect to the first image. As another example, the visual effect information acquisition module 420 may obtain the information about the filter used to apply the visual effect to the first image from the camera 310.

In an embodiment, the information about the visual effect applied to the first image to obtain the second image may include information about the inverse filter of the filter (or inverse lookup table or inverse matrix or inverse function) used to apply the visual effect to the first image. In an embodiment, when a first filter (e.g., first matrix) is used to apply the visual effect to the image, the inverse filter may be an inverse filter of the first filter (e.g., an inverse matrix of the first matrix).

In an embodiment, upon identifying the visual effect applied to the first image to obtain the second image, the visual effect information acquisition module 420 may identify information about the inverse filter of the filter used to apply the visual effect to the first image.

In an embodiment, the visual effect information acquisition module 420 may obtain the information about the inverse filter of the filter used to apply the visual effect to the first image from the camera 310.

In an embodiment, the visual effect information acquisition module 420 may obtain the inverse filter based on the information about the filter used to apply the visual effect to the first image. For example, the visual effect information acquisition module 420 may identify the filter used to apply the visual effect to the first image. The visual effect information acquisition module 420 may obtain the inverse filter of the identified filter by producing (e.g., computing) the inverse filter of the identified filter.

In an embodiment, the visual effect module 430 may obtain the second image by applying the visual effect to the first image. For example, the visual effect module 430 may obtain the second image by applying the visual effect to the first image using a camera application. As another example, the visual effect module 430 may obtain the second image by applying the visual effect to the first image using the image editing application.

In an embodiment, the visual effect module 430 may reversely apply the visual effect to the second image. In an embodiment, when obtaining the second image by applying the visual effect to the first image, the visual effect module 430 may reversely apply the visual effect applied to the first image to obtain the second image. For example, when applying a first visual effect to the first image using a first filter to obtain the second image, the visual effect module 430 may reversely apply the first visual effect to the second image using the inverse filter of the first filter. Hereinafter, the image obtained by reversely applying the visual effect to the second image is referred to as a 'third image'.

In an embodiment, the restoration information acquisition module 440 may obtain information for restoring the first image (hereinafter, referred to as 'restoration information') from the second image.

In an embodiment, the restoration information acquisition module 440 may obtain restoration information based on the first image and the third image. For example, the restoration information acquisition module 440 may perform a subtraction operation (also referred to as 'difference operation') between the first image (e.g., first image data) and the third image (e.g., third image data), obtaining difference data (also referred to as 'parity data'). The restoration information acquisition module 440 may obtain the difference data as the restoration information. Examples of operations in which the restoration information acquisition module 440 obtains the restoration information are described below in detail.

In an embodiment, the storage module 450 may store at least one of the first image or the second image in the memory 330. For example, the storage module 450 may store the first image in the memory 330 when visual effects are not applied to the first image obtained through the camera 310. In another example, the storage module 450 may temporarily store the first image obtained through the camera 310, and when the second image is obtained by applying the visual effect to the first image, delete the temporarily stored first image and store the second image in the memory 330.

In an embodiment, the storage module 450 may store the second image, visual effect information, and restoration information in the memory 330. For example, when the second image is obtained by applying the visual effect to the first image, the storage module 450 may store, in the memory 330, the data of the obtained second image, information about the inverse filter of the filter used to apply the visual effect to the first image, and restoration information.

In an embodiment, the storage module 450 may generate one file by combining the obtained image, information about the visual effect, and restoration information and store the generated file in the memory 330. For example, when the second image is obtained by applying the visual effect to the first image, the storage module 450 may generate one file by combining the data of the obtained second image, information about the inverse filter of the filter used to apply the visual effect to the first image, and the restoration information. The storage module 450 may store one generated file in the memory 330. In another example, the storage module 450 may temporarily store the first image obtained through the camera 310 (or the first image stored in the memory 330), and when the second image is obtained by applying the visual effect to the first image, delete the temporarily stored first image and store the second image in the memory 330. The storage module 450 may generate one file by combining (e.g., adding) information about the visual effect and restoration information to the second image stored in the memory 330.

In an embodiment, the storage module 450 may individually store the second image, visual effect information, and restoration information in the memory 330, and may store information (e.g., association information between the second image, the visual effect information, and restoration information) for associating (or connecting) the second image, visual effect information, and restoration information in the memory 330.

In an embodiment, the restoration module 460 may restore the first image. For example, the restoration module 460 may obtain the third image from the second image based on the visual effect information. The restoration module 460 may restore the first image based on the third image and the restoration information. Examples of operations in which the restoration module 460 restores the first image are described below in detail.

FIG. 4 illustrates that the image acquisition module 410, the visual effect information acquisition module 420, the visual effect module 430, the restoration information acquisition module 440, the storage module 450, and the restoration module 460 are independent (or separate) modules, but is not limited thereto. For example, at least some of the modules shown in FIG. 4 may be coupled (or integrated) as one module.

In an embodiment, at least some of the modules shown in FIG. 4 may perform at least one operation sequentially or in parallel. For example, the respective operations of the modules shown in FIG. 4 may be sequentially performed. As another example, at least one of the operation in which the storage module 450 stores the second image in the memory 330, the operation in which the visual effect module 430 obtains the third image, or the operation in which the restoration module 460 obtains the restoration information may be performed in parallel.

According to various embodiments of the disclosure, an electronic device 101 may comprise at least one processor 340 and a memory 330 functionally connected with the at least one processor 340. The memory 330 may store instructions that, when executed, enable the at least one processor 340 to obtain a first image, obtain a second image by applying a visual effect to the first image, obtain a third image by reversely applying the visual effect to the second image, obtain restoration information for restoring the first image, based on the first image and the third image, and store the second image, information about the visual effect, and the restoration information in the memory 330.

In various embodiments, the instructions may enable the at least one processor 340 to obtain an inverse filter of a filter used to apply the visual effect to the first image and obtain the third image by reversely applying the visual effect to the second image using the inverse filter.

In various embodiments, the instructions may enable the at least one processor 340 to obtain the restoration information by performing a subtraction operation between the first image and the third image.

In various embodiments, the instructions may enable the at least one processor 340 to obtain difference data by performing a subtraction operation between data of the first image and data of the third image, identify whether a size of the difference data is larger than or equal to a threshold size, and obtain the restoration information based on the size of the difference data being larger than or equal to the threshold size.

In various embodiments, the information about the visual effect may include information about an inverse filter of a filter used to apply the visual effect to the first image.

In various embodiments, the instructions may enable the at least one processor 340 to generate one file by combining the second image, information about the inverse filter, and the restoration information, and store the generated one file in the memory 330. The first image may not be stored in the memory 330.

In various embodiments, the instructions may enable the at least one processor 340 to obtain an input for restoring the first image, obtain the third image by reversely applying the visual effect to the second image based on information about the visual effect, and obtain the first image based on the third image and the restoration information.

In various embodiments, the instructions may enable the at least one processor 340 to store the second image in the memory 330 and perform, in parallel, an operation for storing the second image in the memory 330, an operation for obtaining the third image, and an operation for obtaining the restoration information.

In various embodiments, the electronic device 101 may further comprise a camera 310. The first image may be an image obtained based on camera settings of the camera 310.

In various embodiments, the instructions may enable the at least one processor 340 to, based on the first image being an image to which a visual effect was previously applied and which is stored in the memory 330, store the second image, the information about the visual effect, and the restoration information in the memory 330 without storing information about the previously applied visual effect.

Figure 5:
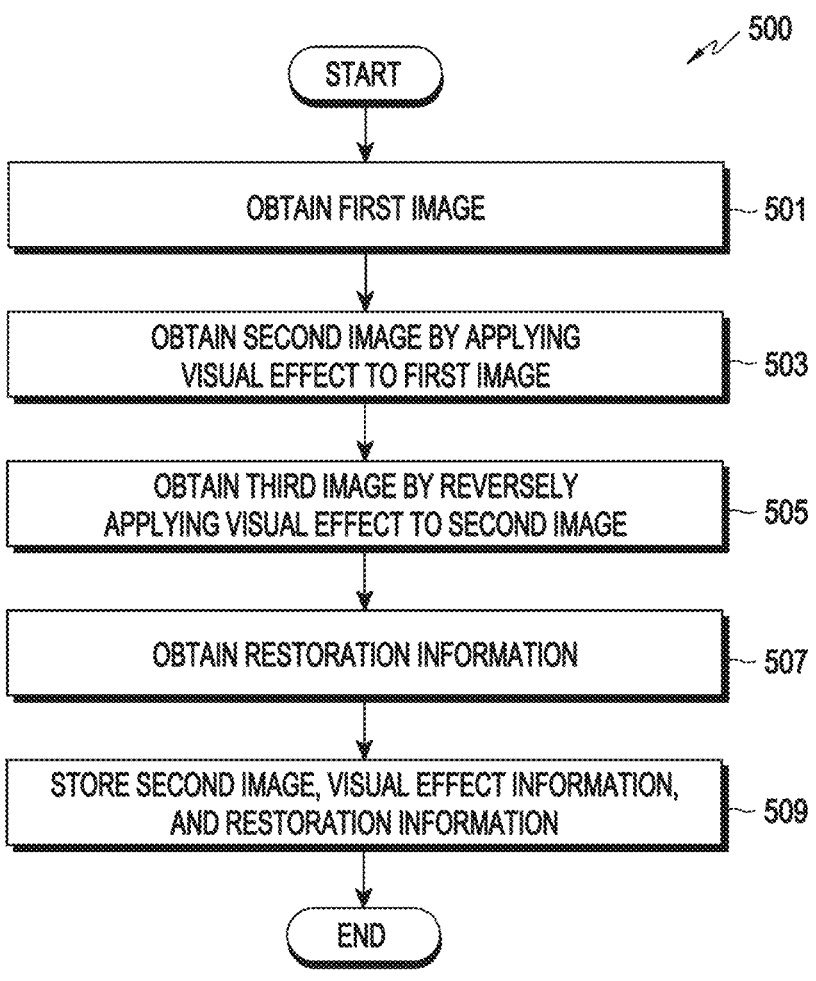
FIG. 5 is a flowchart illustrating a method for providing an image according to various embodiments.

FIG. 5 is a flowchart 500 illustrating a method for providing an image according to various embodiments.

Figure 6:
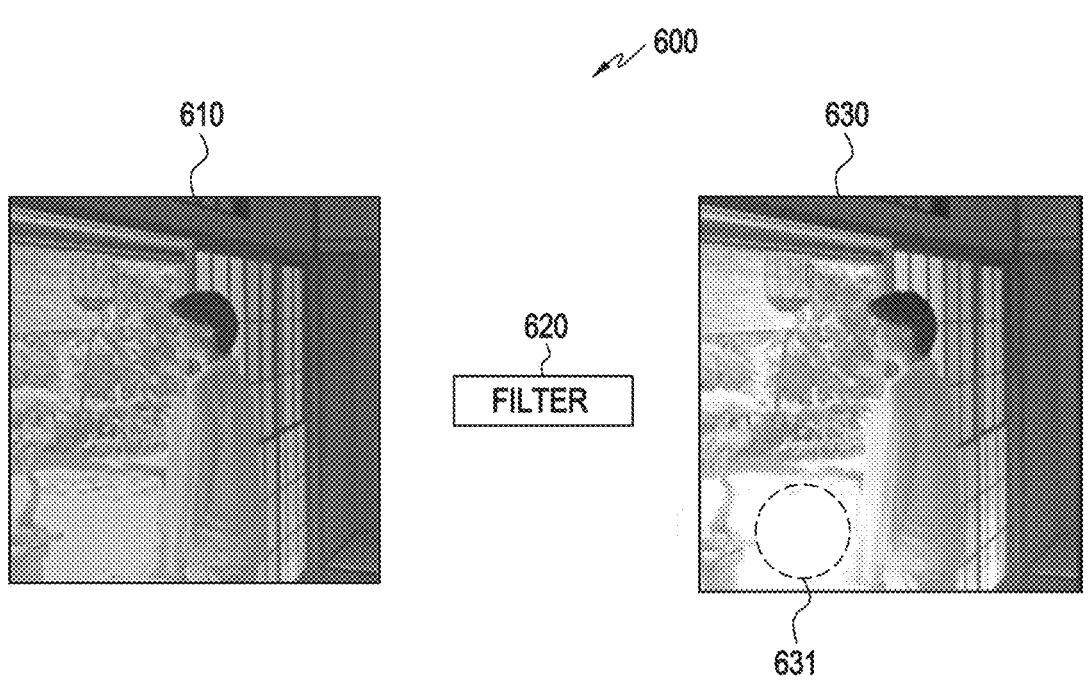
FIG. 6 is a view illustrating an example method for obtaining a second image according to various embodiments.

FIG. 6 is a view 600 illustrating an example method for obtaining a second image according to various embodiments.

Figure 7:
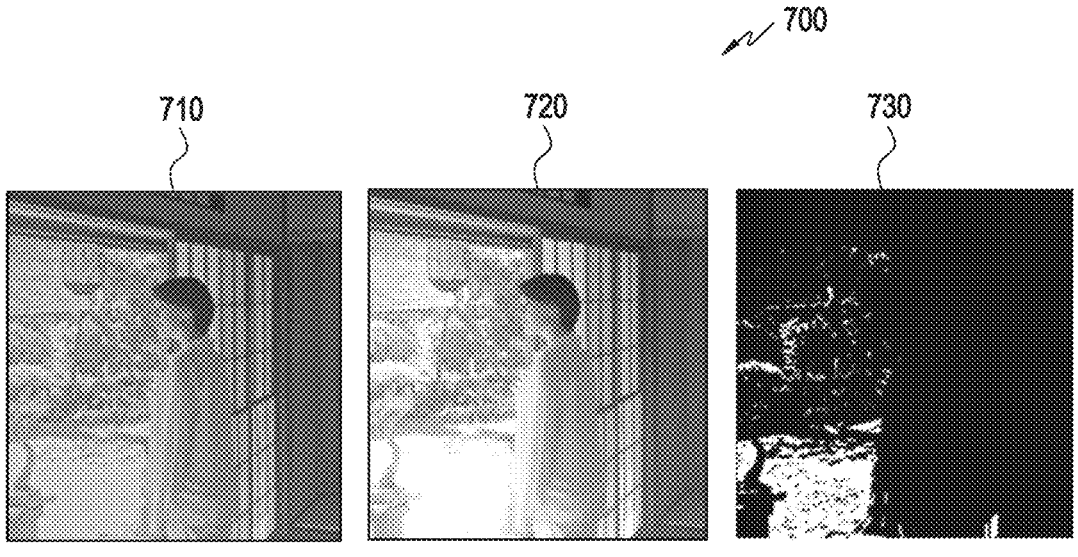
FIG. 7 is a view illustrating an example method for obtaining restoration information according to various embodiments.

FIG. 7 is a view 700 illustrating an example method for obtaining restoration information according to various embodiments.

Referring to FIGS. 5 to 7, in operation 501 of flowchart 500, in an embodiment, the processor 340 may obtain a first image.

In an embodiment, the first image may be an image obtained based on camera settings. In an embodiment, the first image may refer to an image to which no visual effects are applied. In an embodiment, the first image may be an image to which a visual effect is to be applied. For example, the first image may be an image before application of the visual effect to be currently applied. In another example where after a first visual effect is applied to an image, the image is stored in the memory 330, and a second visual effect is applied to the first visual effect-applied image stored in the memory 330, the first image may be the first visual effect-applied image to which the second visual effect is to be applied and which is stored in the memory 330.

In an embodiment, the processor 340 may obtain the first image (original image) through the camera 310. For example, the processor 340 may obtain the first image from the camera 310 when the first image is obtained through the camera 310.

In an embodiment, the processor 340 may obtain the first image from the memory 330. For example, the processor 340 may obtain an image, selected from among the plurality of images stored in the memory 330 based on a user input, as the first image, while the image editing application is running.

In an embodiment, the processor 340 may obtain the first image from the external electronic device 102 or 104 (or server 108) through the communication module 190. For example, the processor 340 may obtain the first image received from the external electronic device 102 or 104 (or server 108) in real-time through the communication module 190.

In operation 503, in an embodiment, the processor 340 may obtain the second image by applying the visual effect to the first image.

In an embodiment, the processor 340 may obtain the second image from the camera 310. For example, when obtaining the second image by applying the visual effect to the first image obtained after the camera 310 obtains the first image, the processor 340 may obtain the second image from the camera 310.

In an embodiment, the processor 340 may obtain the second image by applying the visual effect to the first image. For example, the processor 340 may obtain the second image by applying the visual effect to the first image using a camera application. As another example, the processor 340 may obtain the second image by applying the visual effect to the first image using the image editing application or an image editing function.

In an embodiment, the visual effect may refer to an effect visually appearing on the image as an attribute of the image is changed. In an embodiment, the attributes of the first image may include at least one of color tone, contrast, brightness, saturation, image complexity, sharpness, shadow, and color temperature. However, the attributes of the first image are not limited to the above-described example, in an embodiment, the visual effect may include a filter effect (e.g., an effect with a color tone filter applied), a blur effect, a vignetting effect, portrait retouching, a bokeh effect, an image zoom in and/or out, and an image rotation. However, the visual effect is not limited to the above-described examples, and may include all effects that may be visually displayed in the image by changing one or more attributes of the image.

In an embodiment, as at least part of applying the visual effect to the first image, the processor 340 may perform the operation of changing the attribute of the first image, using a filter (e.g., a color tone filter) (or a look-up table, or a matrix, or a function) to change at least one of the attributes of the image.

In an embodiment, the processor 340 may obtain the second image 630 by applying the visual effect to the first image 610 using the filter 620 as shown in FIG. 6. In an embodiment, when the visual effect is applied to the first image 610 using the filter 620, the second image 630 may contain a quality-degraded portion 631. When reversely applying the visual effect to the second image 630 containing the quality-degraded portion 631 (e.g., reversely applying the visual effect using the inverse filter of the filter 620), it may be hard to restore the first image 610. For example, when reversely applying the visual effect to the second image 630 containing the quality-degraded portion 631, the first image 610 may not be obtained. Although FIG. 6 illustrates an example in which the second image contains the quality-degraded portion, even when the second image does not contain a quality-degraded portion (e.g., when the quality of the second image is not degraded), the first image may not be obtained even by reversely applying the visual effect, which has been applied to the first image to obtain the second image, to the second image. In an embodiment, although FIG. 6 illustrates the second image 630 obtained by applying the visual effect (e.g., visual effect using a color tone filter) to the entire first image 610, embodiments are not limited thereto. For example, the second image 630 may be obtained by applying a visual effect (e.g., portrait retouching) to part of the first image 610.

In operation 505, in an embodiment, the processor 340 may obtain the third image by reversely applying the visual effect to the second image.

In an embodiment, the processor 340 may obtain information about the visual effect applied to the first image to obtain the second image.

In an embodiment, the information about the visual effect applied to the first image to obtain the second image may include information about the inverse filter of the filter (or inverse lookup table or inverse matrix or inverse function) used to apply the visual effect to the first image. In an embodiment, when a first filter (e.g., first matrix) is used to apply the visual effect to the image, the inverse filter may be an inverse filter of the first filter (e.g., an inverse matrix of the first matrix).

In an embodiment, upon identifying the visual effect applied to the first image to obtain the second image, the processor 340 may identify information about the inverse filter of the filter used to apply the visual effect to the first image.

In an embodiment, the processor 340 may obtain the information about the inverse filter of the filter used to apply the visual effect to the first image from the camera 310.

In an embodiment, the processor 340 may obtain the inverse filter based on the information about the filter used to apply the visual effect to the first image. For example, the processor 340 may identify the filter used to apply the visual effect to the first image. The processor 340 may obtain the inverse filter of the identified filter by producing (e.g., computing) the inverse filter of the identified filter.

In an embodiment, the processor 340 may reversely apply the visual effect to the second image. In an embodiment, when obtaining the second image by applying the visual effect to the first image, the processor 340 may reversely apply the visual effect applied to the first image to obtain the second image. For example, when applying a first visual effect to the first image using a first filter to obtain the second image, the processor 340 may reversely apply the first visual effect to the second image using the inverse filter of the first filter.

In an embodiment, the processor 340 may obtain the image obtained by reversely applying the visual effect to the second image, as the third image.

In operation 507, in an embodiment, the processor 340 may obtain restoration information for restoring the first image based on the first image and the third image.

In an embodiment, the processor 340 may obtain difference data by performing a subtraction operation between the first image (e.g., first image data) and the third image (e.g., third image data). The processor 340 may obtain the difference data as the restoration information.

In an embodiment, the processor 340 may obtain difference data by subtracting values of pixels of the third image respectively corresponding to pixels of the first image from values of pixels of the first image. For example, the processor 340 may obtain the difference data by subtracting the pixel values of the third image in the positions respectively corresponding to the pixel positions of the first image from the pixel values of the first image. For example, in FIG. 7, the image 710 may represent the first image, the image 720 may represent the third image, and the image 730 may be an image represented by the difference data obtained by subtracting the data of the image 720 from the data of the image 710.

In operation 509, in an embodiment, the processor 340 may store the second image, visual effect information, and restoration information in the memory 330.

In an embodiment, the processor 340 may store the obtained image, visual effect information, and restoration information in the memory 330. For example, when the second image is obtained by applying the visual effect to the first image, the processor 340 may store, in the memory 330, the data of the obtained second image, information about the inverse filter of the filter used to apply the visual effect to the first image, and restoration information.

In an embodiment, the processor 340 may generate one file by combining the obtained image, information about the visual effect, and restoration information and store the generated file in the memory 330. For example, when the second image is obtained by applying the visual effect to the first image, the processor 340 may generate one file by combining the data of the obtained second image, information about the inverse filter of the filter used to apply the visual effect to the first image, and the restoration information. The processor 340 may store one generated file in the memory 330. In another example, the processor 340 may temporarily store the first image obtained through the camera 310 (or the first image stored in the memory 330), and when the second image is obtained by applying the visual effect to the first image, delete the temporarily stored first image and store the second image in the memory 330. The processor 340 may generate one file by combining (e.g., adding) information about the visual effect and restoration information to the second image stored in the memory 330.

In an embodiment, the processor 340 may individually store the second image, visual effect information, and restoration information in the memory 330, and may store information (e.g., association information between the second image, the visual effect information, and restoration information) for associating (or connecting) the second image, visual effect information, and restoration information in the memory 330.

Although not shown in FIG. 5, in an embodiment, the processor 340 may apply the example operations of FIG. 5 even when the first image is an image to which the visual effect has been applied previously (e.g., before applying the visual effect in operation 503) and which is stored in the memory 330. For example, when the first image is an image to which the visual effect (e.g., first visual effect) has previously been applied and which is stored in the memory 330, the processor 340 may obtain the second image by applying the visual effect (e.g., second visual effect) to the first image. The processor 340 may obtain the third image by reversely applying the visual effect (e.g., second visual effect) to the obtained second image. The processor 340 may obtain the restoration information about the first image based on the first image and the third image. The processor 340 may store the obtained second image, information about the visual effect (e.g., information about the second visual effect), and restoration information in the memory 330. In an embodiment, when the processor 340 stores the obtained second image, the information about the visual effect (e.g., the second visual effect), and the restoration information in the memory 330, the processor 340 may not store (e.g., may delete) the information about the visual effect (e.g., the first visual effect) that has been applied to the first image (and the restoration information stored together with the first visual effect information and the first image data).

In an embodiment, when the second image includes a plurality of images (e.g., a plurality of image frames), the processor 340 may store, in the memory 330, data for each of the plurality of images, restoration information about each of the plurality of images, and information about the visual effect applied to the plurality of images.

In an embodiment, as the processor 340 stores the second image, visual effect information, and restoration information while not storing the first image (original image) (e.g., temporarily store and then delete the first image), more storage space may be secured than when the first image and the second image are stored.

Figure 8:
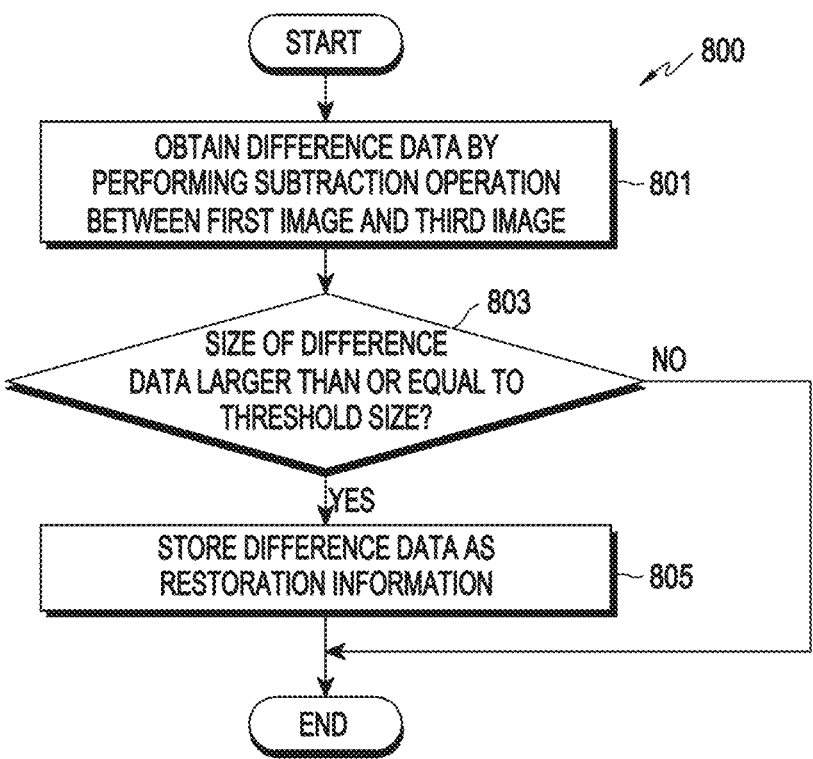
FIG. 8 is a flowchart illustrating an example method for obtaining restoration information according to various embodiments.

FIG. 8 is a flowchart 800 illustrating a method for obtaining restoration information according to various embodiments.

In an embodiment, the operations of FIG. 8 may be included in operation 507 of obtaining the restoration information in FIG. 5.

Referring to FIG. 8, in operation 801, in an embodiment, the processor 340 may obtain difference data by performing a subtraction operation between the first image and the third image. For example, the processor 340 may obtain difference data by subtracting values of pixels of the third image respectively corresponding to pixels of the first image from values of pixels of the first image.

In operation 803, in an embodiment, the processor 340 may identify whether the size of difference data (or amount of difference data) is larger than or equal to a threshold size (or threshold data amount).

In operation 805, in an embodiment, the processor 340 may store the difference data, as restoration information, in the memory 330 when the size of the difference data is larger than or equal to the threshold size.

In operation 805, in an embodiment, the processor 340 may not store the difference data in the memory 330 when the size of the difference data is less than the threshold size.

In an embodiment, when the size of the difference data is less than the threshold size, the data of the first image and the data of the third image may be substantially the same (or similar). In this case, restoration information may not be required to restore the first image.

In an embodiment, the processor 340 may store information indicating that the size of the difference data is less than the threshold size, as restoration information, in the memory 330 when the size of the difference data is less than the threshold size.

However, without limitations thereto, the processor 340 may store the difference data, as restoration information, in the memory 330 although the size of the difference data is less than the threshold size.

Figure 9:
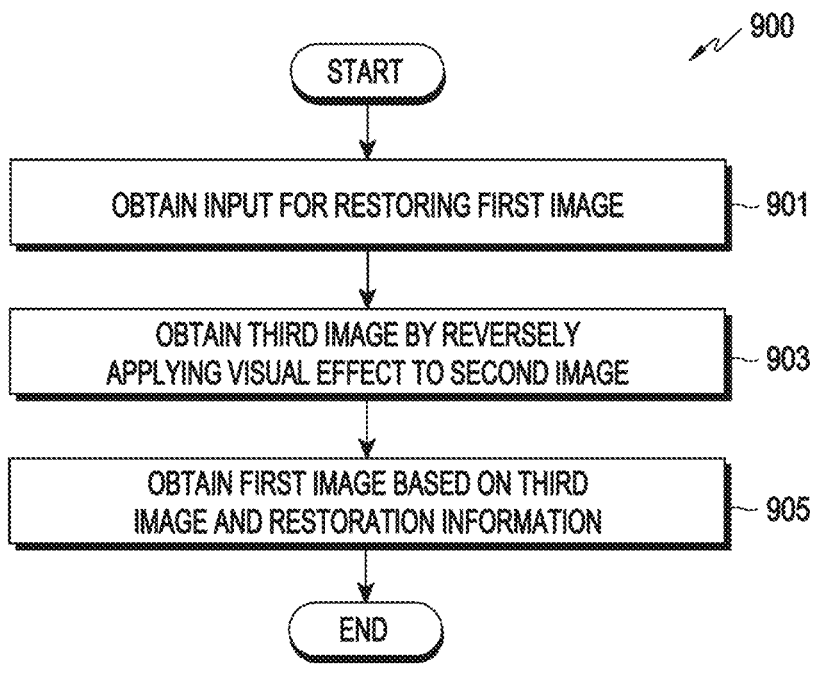
FIG. 9 is a flowchart illustrating a method for restoring a first image according to various embodiments.

FIG. 9 is a flowchart 900 illustrating a method for restoring a first image according to various embodiments.

Referring to FIG. 9, in operation 901, in an embodiment, the processor 340 may obtain (e.g., receive) an input for restoring the first image.

In an embodiment, the processor 340 may display, through the display 320, the object (e.g., icon) corresponding to (e.g., mapped to) the function for restoring the first image from the second image while the camera application or image editing application is running. The processor 340 may obtain an input for the object corresponding to the function of restoring the first image from the second image from the user.

In operation 903, in an embodiment, the processor 340 may obtain the third image by reversely applying the visual effect to the second image.

In an embodiment, the processor 340 may obtain information about the visual effect stored in the memory 330 along with the second image. For example, the processor 340 may obtain the information about the inverse filter of the filter used to apply the visual effect to the first image upon obtaining the second image.

In an embodiment, the processor 340 may obtain the third image by reversely applying the visual effect to the second image using the inverse filter.

In operation 905, in an embodiment, the processor 340 may obtain (e.g., restore) the first image based on the third image and restoration information.

In an embodiment, the processor 340 may identify the restoration information stored, together with the second image, in the memory 330. For example, the processor 340 may identify the difference data stored, along with the data of the second image, in the memory 330. The processor 340 may obtain the data of the first image by performing a summation operation between the data of the third image and the difference data. For example, the processor 340 may obtain the first image data by summating the values of the pixels of the third image and the difference data values respectively corresponding to the pixels of the third image.

In an embodiment, the processor 340 may restore the first image with no data loss upon restoring the first image by performing the operations shown in FIG. 9.

In an embodiment, the processor 340 may restore the first image with no data loss, allowing for re-editing on the restored first image.

Figure 10:
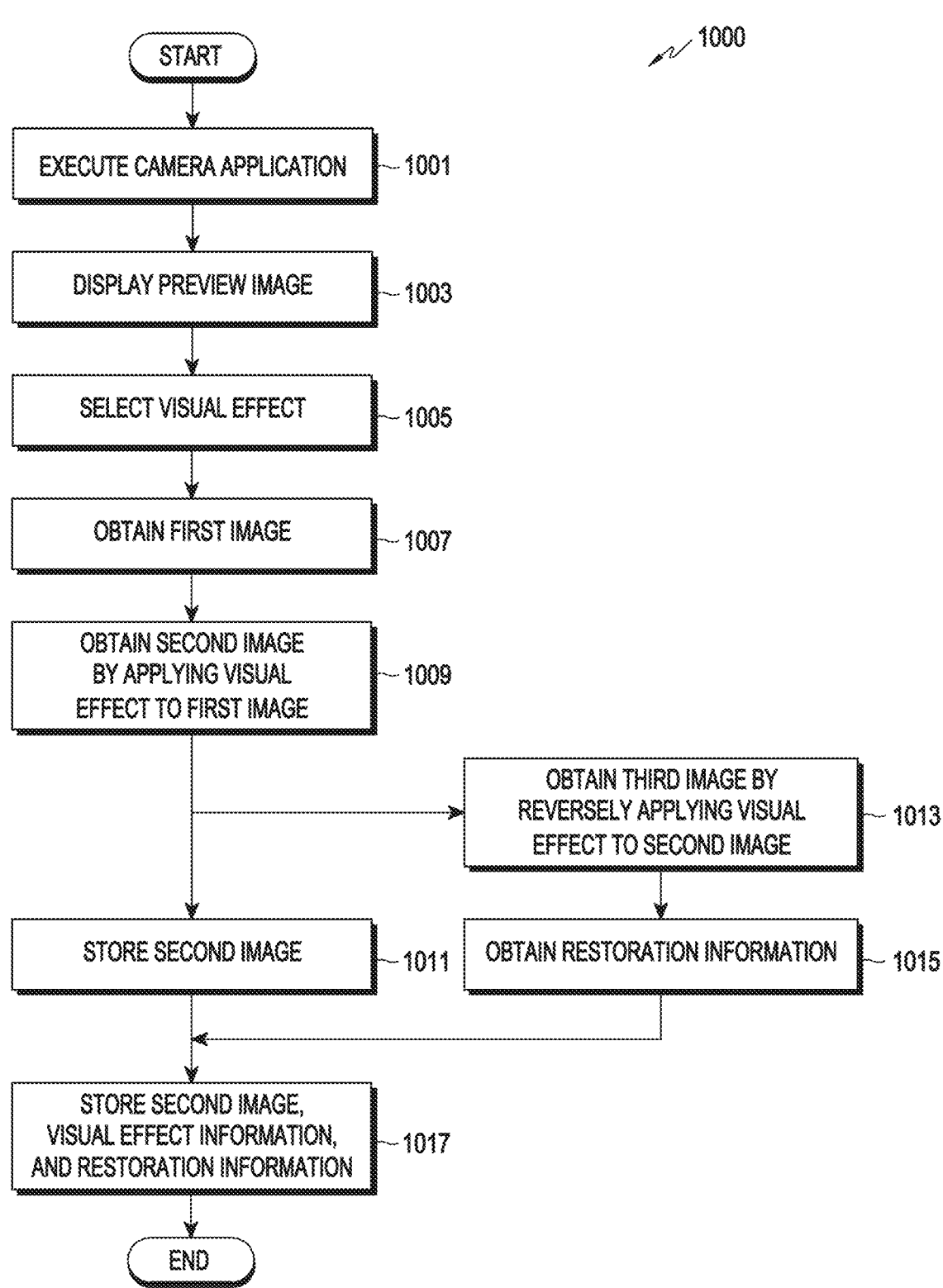
FIG. 10 is a flowchart illustrating a method for providing an image according to various embodiments.

FIG. 10 is a flowchart 1000 illustrating a method for providing an image according to various embodiments.

Referring to FIG. 10, in operation 1001, in an embodiment, the processor 340 may execute a camera application.

In operation 1003, in an embodiment, the processor 340 may display, through the display 320, a preview image based on the image obtained through the camera 310 while the camera application is running.

In operation 1005, in an embodiment, the processor 340 may select a visual effect to be applied to the first image, based on a user input.

In an embodiment, the processor 340 may display, through the display 320, one or more images (or objects) indicating one or more selectable visual effects while the preview image is displayed (or before or after the preview image is displayed). In an embodiment, when at least one visual effect is selected from among one or more visual effects based on a user input, the processor 340 may display, through the display 320, a preview image to which the at least one selected effect has been applied.

In operation 1007, in an embodiment, the processor 340 may obtain the first image.

In an embodiment, the processor 340 may obtain the first image based on a user input (e.g., an input for the object for obtaining an image) while the preview image to which at least one selected effect has been applied is displayed. In an embodiment, if the first image is obtained, the processor 340 may temporarily store the obtained first image in the memory 330.

In operation 1009, in an embodiment, the processor 340 may obtain the second image by applying the visual effect to the first image.

In an embodiment, the processor 340 may display, through the display 320, the second image to which at least one effect selected for the obtained first image is applied.

In operation 1011, in an embodiment, the processor 340 may store the obtained second image in the memory 330.

In operation 1013, in an embodiment, the processor 340 may obtain the third image by reversely applying the visual effect to the second image.

In operation 1015, in an embodiment, the processor 340 may obtain restoration information for restoring the first image based on the first image and the third image.

The examples of operations 1013 and 1015 are at least partially the same or similar to the examples of operations 505 and 507 of FIG. 5, and no further detailed description thereof is presented below.

In an embodiment, the processor 340 may perform operation 1011 of storing the second image, operation 1013 of obtaining the third image, and operation 1015 of obtaining the restoration information in parallel. However, without limitations thereto, the processor 340 may perform operations 1013 and 1015 after performing operation 1011 or may perform operation 1011 after performing operations 1013 and 1015.

In operation 1017, in an embodiment, the processor 340 may store the second image, visual effect information, and restoration information in the memory 330.

Since the examples of operation 1017 are at least partially the same or similar to the operation 509 of FIG. 5, no detailed description thereof is presented below.

Figure 11:
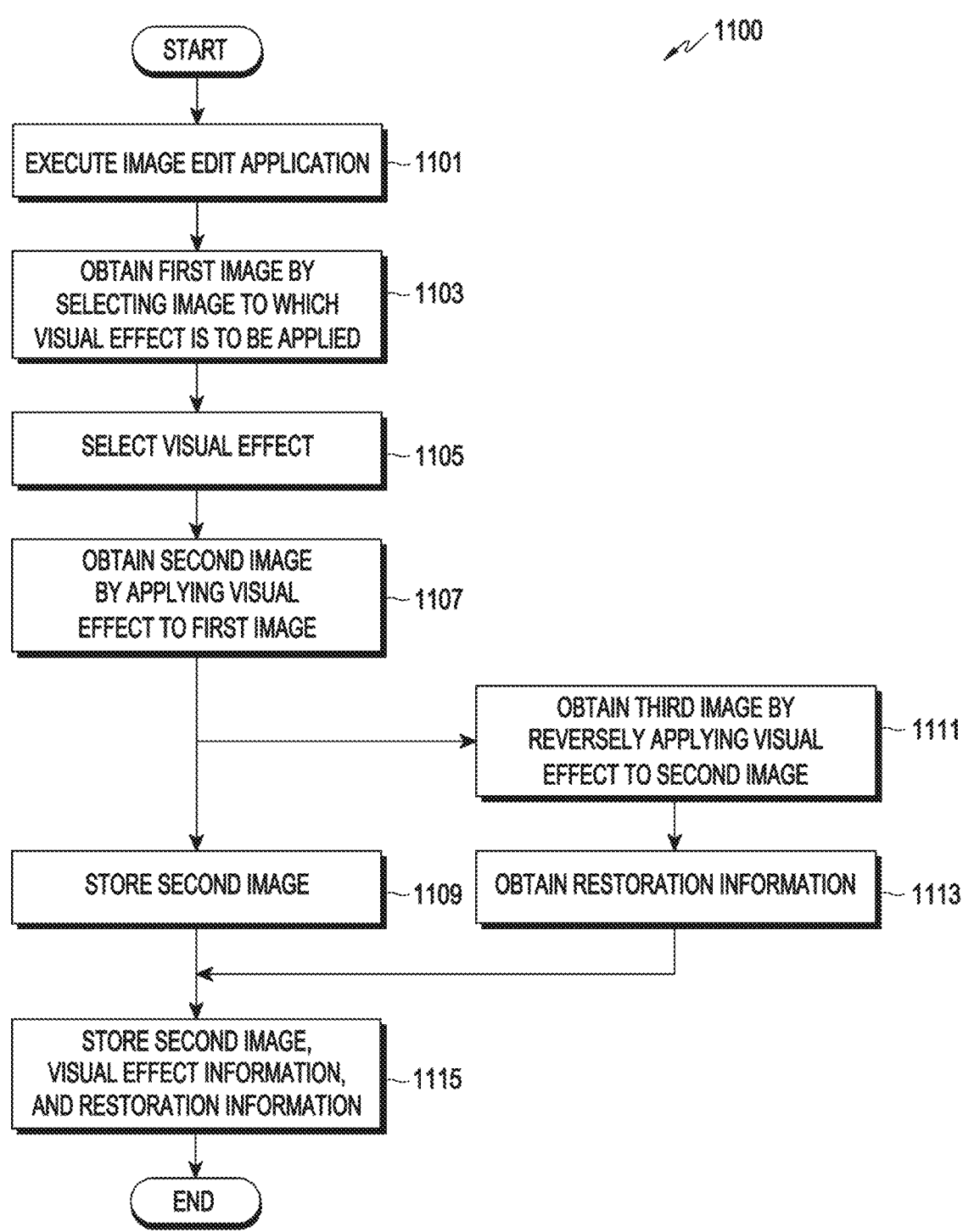
FIG. 11 is a flowchart illustrating a method for providing an image according to various embodiments.

FIG. 11 is a flowchart 1100 illustrating a method for providing an image according to various embodiments.

Referring to FIG. 11, in operation 1101, in an embodiment, the processor 340 may execute an image editing application (e.g., gallery application).

In operation 1103, in an embodiment, the processor 340 may obtain the first image by selecting the image to which the visual effect is to be applied while the image editing application is running.

In an embodiment, the processor 340 may display, through the display 320, one or more images (e.g., one or more thumbnail images) stored in the memory 330 (or image editing application) while the image editing application is running. In an embodiment, the processor 340 may obtain at least one image selected from among one or more images based on the user input, as the first image.

In operation 1105, in an embodiment, the processor 340 may select a visual effect to be applied to the first image, based on a user input.

In an embodiment, the processor 340 may display, through the display 320, one or more images (or objects) indicating one or more selectable visual effects. In an embodiment, the processor 340 may select at least one visual effect which is to be applied to the first image among one or more visual effects based on a user input.

In operation 1107, in an embodiment, the processor 340 may obtain the second image by applying the visual effect to the first image.

In an embodiment, the processor 340 may display, through the display 320, the second image to which at least one effect selected for the obtained first image is applied.

In operation 1109, in an embodiment, the processor 340 may store the obtained second image in the memory 330.

In operation 1111, in an embodiment, the processor 340 may obtain the third image by reversely applying the visual effect to the second image.

In operation 1113, in an embodiment, the processor 340 may obtain restoration information for restoring the first image based on the first image and the third image.

The examples of operations 1109 to 1113 are at least partially the same or similar to the examples of operations 1011 to 1015 of FIG. 10, and no further detailed description thereof is presented below.

In an embodiment, the processor 340 may perform operation 1109 of storing the second image, operation 1111 of obtaining the third image, and operation 1113 of obtaining the restoration information in parallel. However, without limitations thereto, the processor 340 may perform operations 1111 and 1113 after performing operation 1109 or may perform operation 1109 after performing operations 1111 and 1113.

In operation 1115, in an embodiment, the processor 340 may store the second image, visual effect information, and restoration information in the memory 330.

Since the examples of operation 1115 are at least partially the same or similar to the operation 1017 of FIG. 10, and no further detailed description thereof is presented below.

Figure 12:
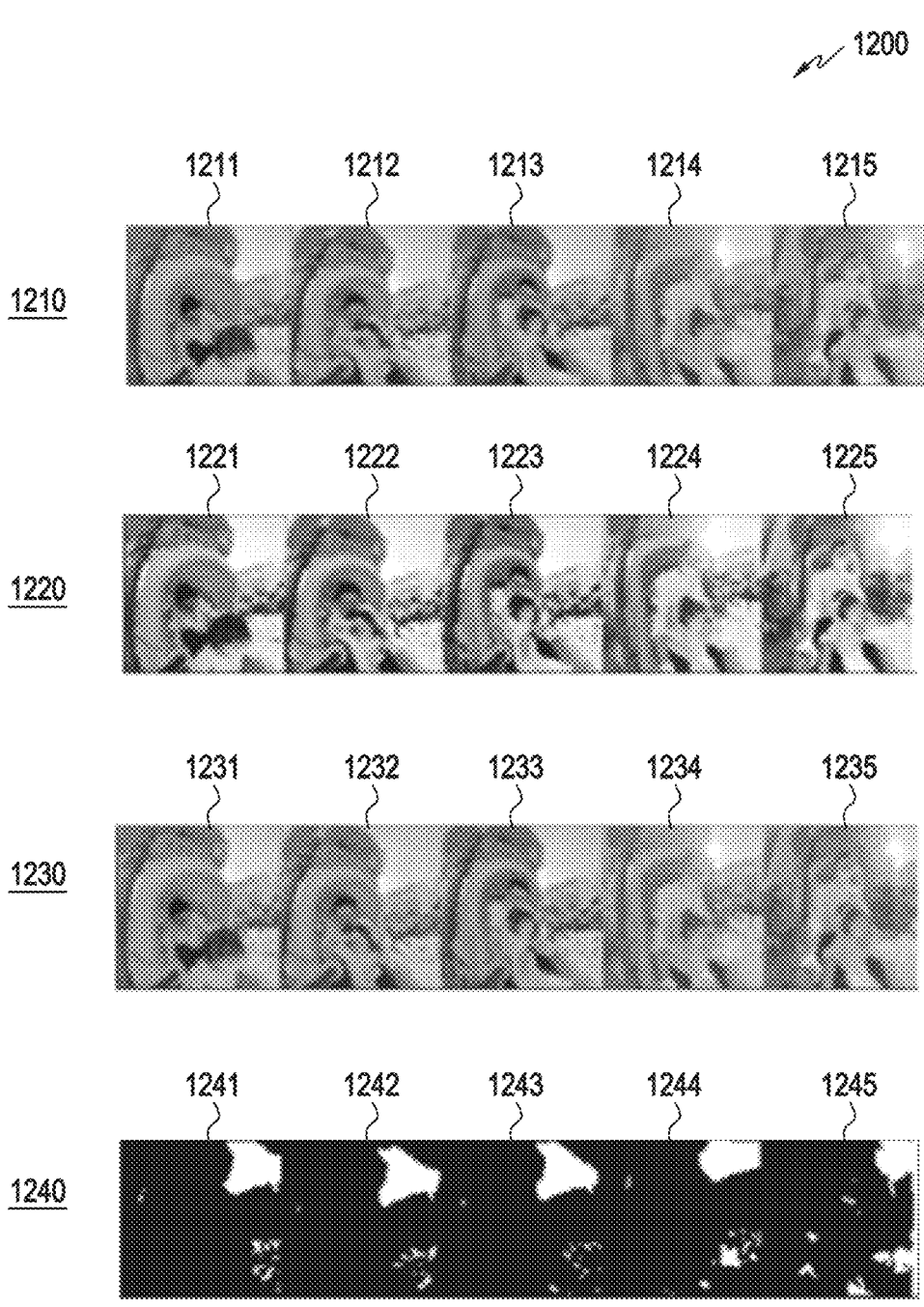
FIG. 12 is a view illustrating an example method for providing an image according to various embodiments.

FIG. 12 is a view 1200 illustrating an example method for providing an image according to various embodiments.

Referring to FIG. 12, in an embodiment, reference number 1210 may indicate a plurality of first images 1211 to 1215. For example, the plurality of first images 1211 to 1215 may be images successively obtained through the camera 310.

In an embodiment, reference number 1220 may indicate a plurality of second images 1221 to 1225 to which visual effect is applied to the plurality of first images 1211 to 1215. For example, the plurality of second images 1221 to 1225 may be images produced by applying one (e.g., same) visual effect to the plurality of first images 1211 to 1215. As another example, the plurality of second images 1221 to

1225 may be images produced by applying the same or different visual effects to the plurality of first images 1211 to 1215.

In an embodiment, reference number 1230 may indicate a plurality of third images 1231 to 1235 to which one or more visual effects are reversely applied to the plurality of second images 1221 to 1225.

In an embodiment, reference number 1240 indicates a plurality of images 1240 represented by difference data obtained through a subtraction operation between the plurality of first images 1211 to 1215 and the plurality of third images 1231 to 1235.

In an embodiment, the processor 340 may store, in the memory 330, data of the plurality of second images 1221 to 1225, information about the one or more visual effects applied to the plurality of first images 1211 to 1215, and data of the plurality of images 1240.

According to various embodiments of the disclosure, a method for providing an image by an electronic device 101 may comprise obtaining a first image by the electronic device 101, obtaining a second image by applying a visual effect to the first image, obtaining a third image by reversely applying the visual effect to the second image, obtaining restoration information for restoring the first image, based on the first image and the third image, and storing the second image, information about the visual effect, and the restoration information in a memory 330 of the electronic device 101.

In various embodiments, obtaining the third image may include obtaining an inverse filter of a filter used to apply the visual effect to the first image and obtaining the third image by reversely applying the visual effect to the second image using the inverse filter.

In various embodiments, obtaining the restoration information may include obtaining the restoration information by performing a subtraction operation between the first image and the third image.

In various embodiments, obtaining the restoration information may include obtaining difference data by performing a subtraction operation between data of the first image and data of the third image, identifying whether a size of the difference data is larger than or equal to a threshold size, and obtaining the restoration information based on the size of the difference data being larger than or equal to the threshold size.

In various embodiments, the information about the visual effect may include information about an inverse filter of a filter used to apply the visual effect to the first image.

In various embodiments, storing the second image, information about the visual effect, and the restoration information in the memory 330 of the electronic device 101 may include generating one file by combining the second image, information about the inverse filter, and the restoration information and storing the generated one file in the memory 330. The first image may not be stored in the memory 330.

In various embodiments, the method may further comprise obtaining an input for restoring the first image, obtaining the third image by reversely applying the visual effect to the second image based on information about the visual effect, and obtaining the first image based on the third image and the restoration information.

In various embodiments, the method may further comprise storing the second image in the memory 330. Storing the second image in the memory 330 may be performed in parallel with obtaining the third image and obtaining the restoration information.

In various embodiments, the first image may be an image obtained based on camera settings of the camera 310 of the electronic device 101.

In various embodiments, storing the second image, the information about the visual effect, and the restoration information in the memory 330 of the electronic device 101 may include, based on the first image being an image to which a visual effect was previously applied and which is stored in the memory 330, storing the second image, information about the visual effect, and the restoration information in the memory 330 without storing information about the previously applied visual effect.

Further, the structure of the data used in embodiments of the disclosure may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

A computer-readable recording medium storing computer-executable programs may store a program for executing, by an electronic device 101, obtaining a second image by applying a visual effect to the first image, obtaining a third image by reversely applying the visual effect to the second image, obtaining restoration information for restoring the first image, based on the first image and the third image, and storing the second image, information about the visual effect, and the restoration information in a memory 330 of the electronic device 101.

Preferable embodiments of the disclosure have been described above. Those of ordinary skill in the art to which the disclosure pertains will understand that the disclosure may be implemented in a modified form without departing from the essential characteristics of the disclosure. Therefore, the disclosed embodiments should be considered from an illustrative, rather than a limiting, point of view. The scope of the disclosure is shown in the claims rather than in the above-described description. All differences within their equivalent range should be construed as included in this disclosure.

The invention claimed is:

1. An electronic device, comprising:
at least one processor; and
memory functionally connected with the at least one processor, wherein the memory stores instructions that, when executed by at least one processor individually or collectively, cause the electronic device to:
obtain a first image;
obtain a second image by applying a visual effect to the first image using a filter corresponding to the visual effect, the visual effect being one among a plurality of visual effects;
obtain a third image by reversely applying, using the inverse filter of the filter, the visual effect to the second image, the inverse filter being obtained based on the filter;
by performing a subtraction operation between the first image and the third image, obtain restoration information for restoring the first image; and
store the second image, information about the inverse filter of the filter used to apply the visual effect to the first image, and the restoration information in the memory.

2. The electronic device of claim 1, wherein the instructions, when executed by at least one processor individually or collectively, cause the electronic device to:

obtain difference data by performing the subtraction operation between data of the first image and data of the third image, wherein the subtraction operation includes subtracting values of pixels of the third image from values of pixels, respectively corresponding to the pixels of the third image, of the first image;
identify whether a size of the difference data is larger than or equal to a threshold size; and
based on the size of the difference data being larger than or equal to the threshold size, store the difference data as the restoration information in the memory,
wherein, based on the size of the difference data being less than the threshold size, the difference data is not stored in the memory.

3. The electronic device of claim 1, wherein the instructions, when executed by at least one processor individually or collectively, cause the electronic device to:
generate one file by combining the second image, the information about the inverse filter, and the restoration information; and
store the generated one file in the memory, wherein the first image is not stored in the memory.

4. The electronic device of claim 1, wherein the instructions, when executed by at least one processor individually or collectively, cause the electronic device to:
obtain an input for restoring the first image;
obtain the third image by reversely applying the visual effect to the second image based on the information about the inverse filter; and
obtain the first image, based on the third image and the restoration information.

5. The electronic device of claim 1, wherein the instructions, when executed by at least one processor individually or collectively, cause the electronic device to:
store the second image in the memory; and
perform, in parallel, an operation for storing the second image in the memory, an operation for obtaining the third image, and an operation for obtaining the restoration information.

6. The electronic device of claim 1, further comprising a camera,
wherein the first image is an image obtained based on camera settings of the camera.

7. The electronic device of claim 1, wherein the instructions, when executed by at least one processor individually or collectively, cause the electronic device to:
based on the first image being an image to which a visual effect was previously applied and which is stored in the memory, store the second image, the information about the inverse filter, and the restoration information in the memory without storing information about the previously applied visual effect.

8. A method for providing an image by an electronic device, the method comprising:
obtaining, by the electronic device, a first image;
obtaining, by the electronic device, a second image by applying a visual effect to the first image using a filter corresponding to the visual effect, the visual effect being one among a plurality of visual effects;
obtaining, by the electronic device, a third image by reversely applying, using the inverse filter of the filter, the visual effect to the second image, the inverse filter being obtained based on the filter;
by performing a subtraction operation between the first image and the third image, obtaining, by the electronic device, restoration information for restoring the first image; and storing the second image, information about the inverse filter of the filter used to apply the visual effect to the first image, and the restoration information in a memory of the electronic device.

9. The method of claim 8, wherein obtaining the restoration information comprises:

obtaining difference data by performing the subtraction operation between data of the first image and data of the third image, wherein the subtraction operation includes subtracting values of pixels of the third image from values of pixels, respectively corresponding to the pixels of the third image, of the first image;

identifying whether a size of the difference data is larger than or equal to a threshold size; and based on the size of the difference data being larger than or equal to the threshold size, storing the difference data as the restoration information in the memory, wherein, based on the size of the difference data being less than the threshold size, the difference data is not stored in the memory.

10. The method of claim 8, wherein storing the second image, the information about the inverse filter, and the restoration information in the memory of the electronic device comprises:

generating one file by combining the second image, the information about the inverse filter, and the restoration information; and storing the generated one file in the memory, wherein the first image is not stored in the memory.

11. The method of claim 8, further comprising:

obtaining an input for restoring the first image;

obtaining the third image by reversely applying the visual effect to the second image based on the information about the inverse filter; and obtaining the first image, based on the third image and the restoration information.

12. The method of claim 8, further comprising:

storing the second image in the memory, wherein storing the second image in the memory is performed in parallel with obtaining the third image and obtaining the restoration information.

13. The method of claim 8, wherein the first image is an image obtained based on camera settings of the camera of the electronic device.

14. The method of claim 8, wherein storing the second image, information about the inverse filter, and the restoration information in the memory of the electronic device comprises:

based on the first image being an image to which a visual effect was previously applied and which is stored in the memory, storing the second image, the information about the inverse filter, and the restoration information in the memory without storing information about the previously applied visual effect.

\* \* \* \* \*